US012292705B2

(12) United States Patent
Shimodaira et al.

(10) Patent No.: US 12,292,705 B2
(45) Date of Patent: May 6, 2025

(54) IMAGE FORMING APPARATUS

(71) Applicant: FUJIFILM Business Innovation Corp., Tokyo (JP)

(72) Inventors: Akira Shimodaira, Kanagawa (JP); Satoshi Tejima, Kanagawa (JP)

(73) Assignee: FUJIFILM Business Innovation Corp., Tokyo (JP)

(*) Notice: Subject to any disclaimer, the term of this patent is extended or adjusted under 35 U.S.C. 154(b) by 0 days.

(21) Appl. No.: 17/880,636

(22) Filed: Aug. 3, 2022

(65) Prior Publication Data

US 2023/0305444 A1 Sep. 28, 2023

(30) Foreign Application Priority Data

Mar. 28, 2022 (JP) ................................ 2022-052244

(51) Int. Cl.
*G03G 15/16* (2006.01)
*G03G 15/01* (2006.01)

(52) U.S. Cl.
CPC ....... *G03G 15/161* (2013.01); *G03G 15/0131* (2013.01); *G03G 2215/0132* (2013.01); *G03G 2215/1623* (2013.01)

(58) Field of Classification Search
CPC ............ G03G 15/161; G03G 15/0131; G03G 2215/0132; G03G 2215/1623
See application file for complete search history.

(56) References Cited

U.S. PATENT DOCUMENTS

| | | | | |
|---|---|---|---|---|
| 2014/0010577 | A1 | 1/2014 | Devlieghere et al. | |
| 2020/0073293 | A1* | 3/2020 | Ichiki | G03G 21/1604 |
| 2021/0294263 | A1* | 9/2021 | Goda | G03G 15/1615 |

FOREIGN PATENT DOCUMENTS

| | | |
|---|---|---|
| JP | H1144973 | 2/1999 |
| JP | 2009003236 | 1/2009 |
| JP | 2014013388 | 1/2014 |

* cited by examiner

*Primary Examiner* — Stephanie E Bloss
*Assistant Examiner* — Michael A Harrison
(74) *Attorney, Agent, or Firm* — JCIPRNET

(57) ABSTRACT

An image forming apparatus includes a conveyance unit conveying a recording medium in contact with the recording medium's one surface along a conveyance path, a first image forming group, a second image forming group, a first intermediate transfer body being transferred a toner image formed by the first image forming group, a second intermediate transfer body being transferred a toner image formed by the second image forming group, a first transfer unit transferring the toner image from the first intermediate transfer body to the recording medium's other surface, and a second transfer unit transferring the toner image from the second intermediate transfer body to the recording medium's other surface. The first image forming group, the first intermediate transfer body, the second intermediate transfer body, and the second image forming group are located the other surface side of the recording medium in this order in a conveyance direction.

12 Claims, 6 Drawing Sheets

IMAGE FORMING APPARATUS

CROSS-REFERENCE TO RELATED APPLICATIONS

This application is based on and claims priority under 35 USC 119 from Japanese Patent Application No. 2022-052244 filed Mar. 28, 2022.

BACKGROUND

(i) Technical Field

The present invention relates to an image forming apparatus.

(ii) Related Art

JP1999-44973A discloses a technique relating to an image forming apparatus such as an electrophotographic copying machine and a printer, and particularly relating to an improvement of a double-sided image forming apparatus capable of forming a double-sided image. In this related art, an air conveyance unit that is disposed on at least one surface side of a recording material conveyance path between a most downstream transfer unit and a fixing unit, a recording material detecting unit which detects information on a recording material to be conveyed, and an air flow rate control unit that controls the air flow rate of the air conveyance unit, based on the detection result from the recording material detecting unit are provided. Further, one or a plurality of rows of star wheels are provided on at least one surface side of a recording material conveyance path so as to be rotatable with respect to the recording material conveyance direction. Further, a temporary fixing unit capable of temporarily fixing an unfixed image on at least one surface side of the recording material is provided, and the temporarily fixed recording material is guided to a fixing unit by a recording material guide member.

JP2009-3236A discloses an image forming apparatus, particularly a technique relating to an image forming apparatus capable of forming a developer image based on image information. In the related art, provided is a color printer capable of forming a developer image based on image information, which includes a main body having a plurality of first image forming units, a first transfer belt, and an elastic roller. The first image forming unit is a unit capable of forming an image of each color based on image information. The images formed by the first image forming unit are transferred to the first transfer belt. The intermediate transfer roller has at least a surface formed of an elastic member, and an image is transferred from the first transfer belt and the transferred image is transferred to paper. The main body can accommodate the first image forming units, the first transfer belt, and an intermediate transfer roller inside, and has a shutter portion that is disposed in the vicinity of the intermediate transfer roller and can be opened and closed.

JP2014-13388A discloses a technique relating to a color image duplication system in which a developed image is transferred from an image forming member to a receiving material via at least one intermediate transfer member. In this related art, a toner, and first and second toner image acquisition devices each having a toner are provided, the first toner image acquisition device transfers the toner to the second toner image acquisition device, and the second toner image acquisition device transfers the toner to the receiving material.

SUMMARY

In an image forming apparatus that secondarily transfers and superimposes toner images in sequence to a recording medium conveyed from a plurality of intermediate transfer bodies to which the toner images are primarily transferred, there is a risk that the recording medium tends to move away from the conveyance path, in a case where a space between the secondary transfer units arranged in the conveyance direction is wide.

Aspects of non-limiting embodiments of the present disclosure relate to an image forming apparatus that narrows a space between secondary transfer units arranged in the conveyance direction, as compared with the case where an image forming section is located between intermediate transfer bodies in the conveyance direction of the recording medium by a conveyance unit.

Aspects of certain non-limiting embodiments of the present disclosure overcome the above disadvantages and/or other disadvantages not described above. However, aspects of the non-limiting embodiments are not required to overcome the disadvantages described above, and aspects of the non-limiting embodiments of the present disclosure may not overcome any of the disadvantages described above.

According to an aspect of the present disclosure, there is provided an image forming apparatus including: a conveyance unit that conveys a recording medium in contact with one surface of the recording medium along a conveyance path; a first image forming group that is provided on the other surface side of the recording medium in the conveyance path, and includes a plurality of image forming sections that form a toner image; a second image forming group that is provided on a downstream side in a conveyance direction of the first image forming group on the other surface side of the recording medium in the conveyance path, and includes a plurality of image forming sections that form a toner image; a first intermediate transfer body that is provided on the downstream side in the conveyance direction of the first image forming group, and to which the toner image formed by the plurality of image forming sections of the first image forming group is primarily transferred; a second intermediate transfer body that is provided on an upstream side in the conveyance direction of the second image forming group, and to which the toner image formed by the plurality of image forming sections of the second image forming group is primarily transferred; a first transfer unit that secondarily transfers the toner image from the first intermediate transfer body to the other surface of the recording medium conveyed by the conveyance unit; and a second transfer unit that secondarily transfers the toner image from the second intermediate transfer body to the other surface of the recording medium conveyed by the conveyance unit.

BRIEF DESCRIPTION OF THE DRAWINGS

Exemplary embodiment(s) of the present invention will be described in detail based on the following figures, wherein:

FIG. 6 is a block diagram showing a configuration of a control device and the like.

DETAILED DESCRIPTION

First Exemplary Embodiment

An image forming apparatus according to a first exemplary embodiment of the present invention will be described.

Figure 1:
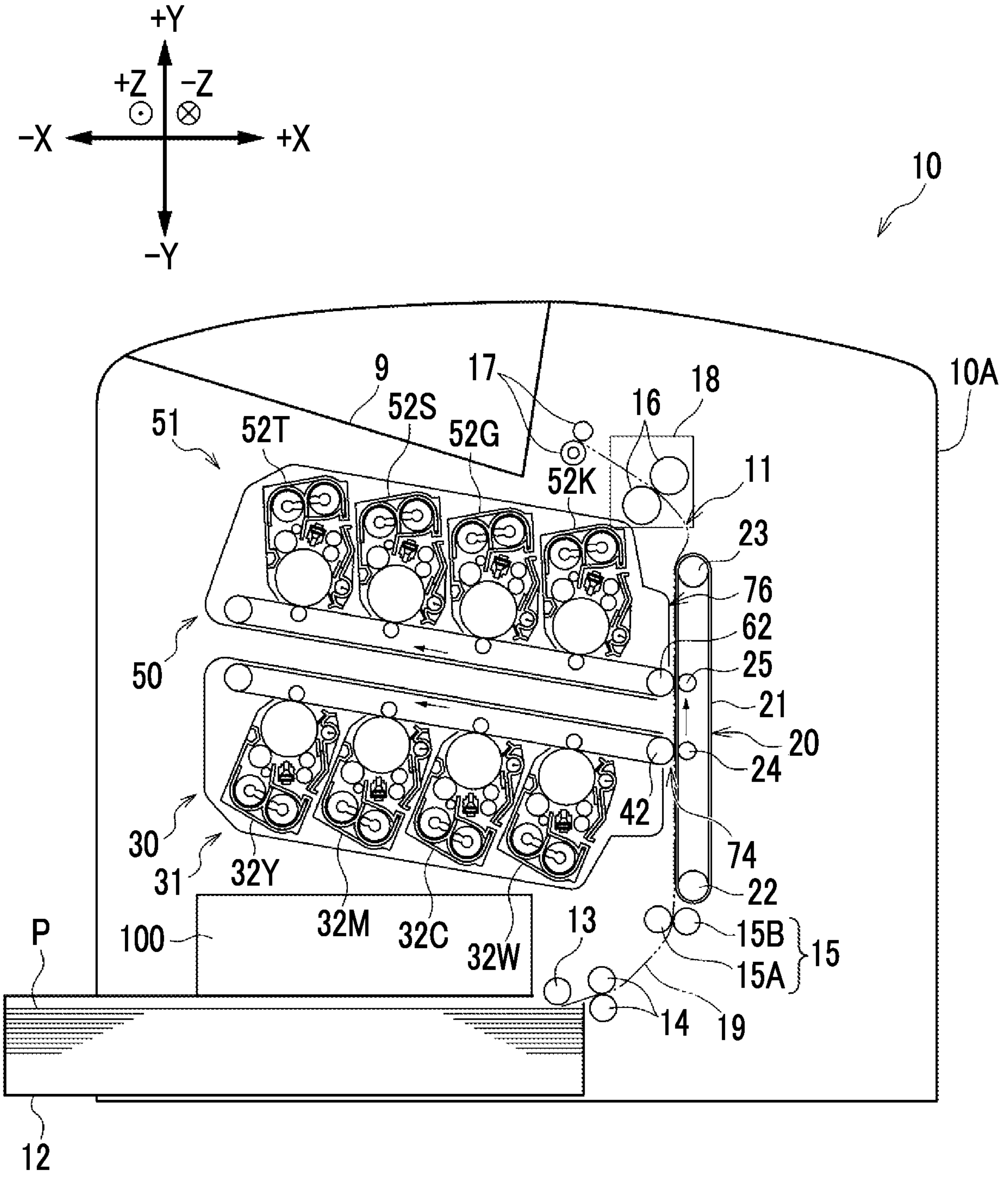
FIG. 1 is a configuration diagram of an image forming apparatus according to a first exemplary embodiment.

The width direction of the image forming apparatus 10 shown in FIG. 1 is an X direction, the height direction is a Y direction, and the depth direction is a Z direction, which are indicated by arrows X, Y, and Z, respectively. In a case where it is necessary to distinguish one side and the other side of the X direction, the Y direction, and the Z direction, with respect to the image forming apparatus 10 shown in FIG. 1, the right side is described as the +X side, the left side is described as the −X side, and the upper side is described as the +Y side, the lower side is described as −Y side, the front side is described as +Z side, and the rear side is described as −Z side. Further, the case of viewing from the depth direction (Z direction) is referred to as a side view.

Further, in the present exemplary embodiment, the recording paper P is adopted as an example of the recording medium, the upstream side in the conveyance direction in which the recording paper P is conveyed is defined as the "upstream side in the conveyance direction", and the downstream side in the conveyance direction is "downstream side in the conveyance direction". The image forming apparatus 10 in the present exemplary embodiment is a so-called single-pass type, and printing is performed by the recording paper P passing through the front of the image forming unit 30 and the image forming unit 50, which will be described later.

Overall Configuration

First, the overall configuration of the image forming apparatus will be described.

As shown in FIG. 1, the image forming apparatus 10 includes an accommodating unit 12 that accommodates recording paper P (see also FIG. 3) as an example of a recording medium, a conveyance unit 11 that conveys the recording paper P along a conveyance path 19, and an image forming unit 30 and an image forming unit 50 that form a toner image to be transferred to the recording paper P. The "conveyance direction" is the direction in which the recording paper P is conveyed along the conveyance path 19.

The accommodating unit 12 can be pulled out from the image forming apparatus main body 10A, which is the apparatus main body of the image forming apparatus 10, and accommodates the recording paper P.

The conveyance unit 11 includes a feed roll 13, a conveyance roll 14, a resist roll pair 15, a conveyor belt device 20, a fixing device 18, a discharge roll 17, and the like, in order from the upstream side in the conveyance direction.

The feed roll 13 sends out the recording paper P accommodated in the accommodating unit 12 to the conveyance path 19 configuring the conveyance unit 11. The conveyance roll 14 conveys the recording paper P along the conveyance path 19.

The resist roll pair 15 conveys the recording paper P conveyed by the conveyance roll 14 to a secondary transfer position TJ2 on the upstream side, which will be described later. The resist roll pair 15 sandwiches the recording paper P between the resist roll 15A and the pinch roll 15B, and conveys the recording paper P to the downstream side in the conveyance direction.

The conveyor belt device 20 conveys the recording paper P to the downstream side in the conveyance direction along the conveyance path 19 while transferring the toner image formed by the image forming units 30 and 50 to the recording paper P. The details of the conveyor belt device 20 will be described later.

The fixing device 18 has a fixing roll pair 16, and in a case where the recording paper P on which the toner image is transferred passes through the fixing roll pair 16, the fixing device 18 heats and pressurizes the recording paper P to fix the toner image on the recording paper P.

The discharge roll 17 discharges the recording paper P on which the toner image is fixed by the fixing device 18, to the discharge unit 9.

The image forming unit 30 and the image forming unit 50 are disposed side by side in the vertical direction. In the present exemplary embodiment, the image forming unit 50 is disposed above the image forming unit 30. From another point of view, the image forming unit 50 is disposed on the downstream side in the conveyance direction of the image forming unit 30.

Figure 2:
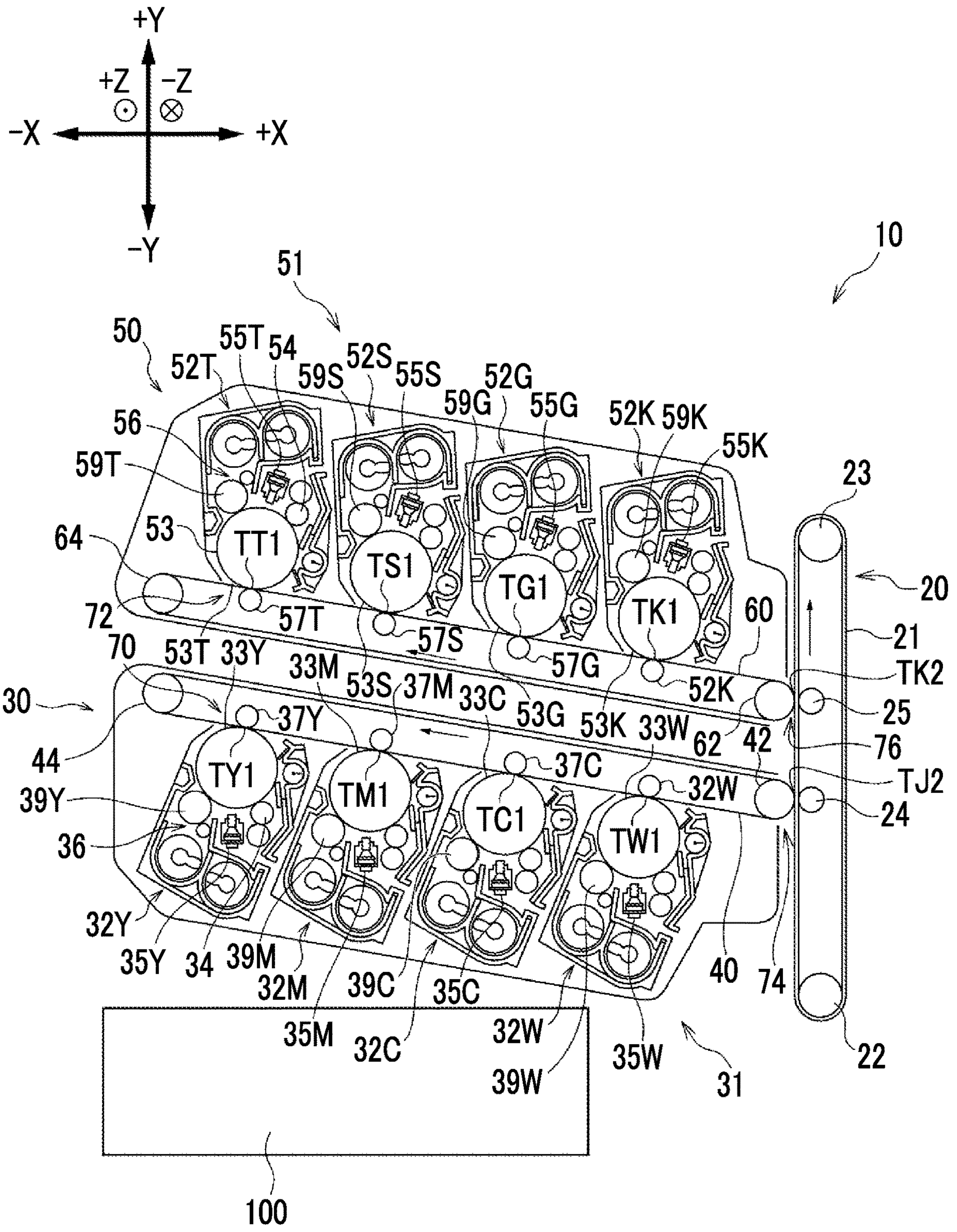
FIG. 2 is an enlarged view of a main part of FIG. 1.
Figure 3:
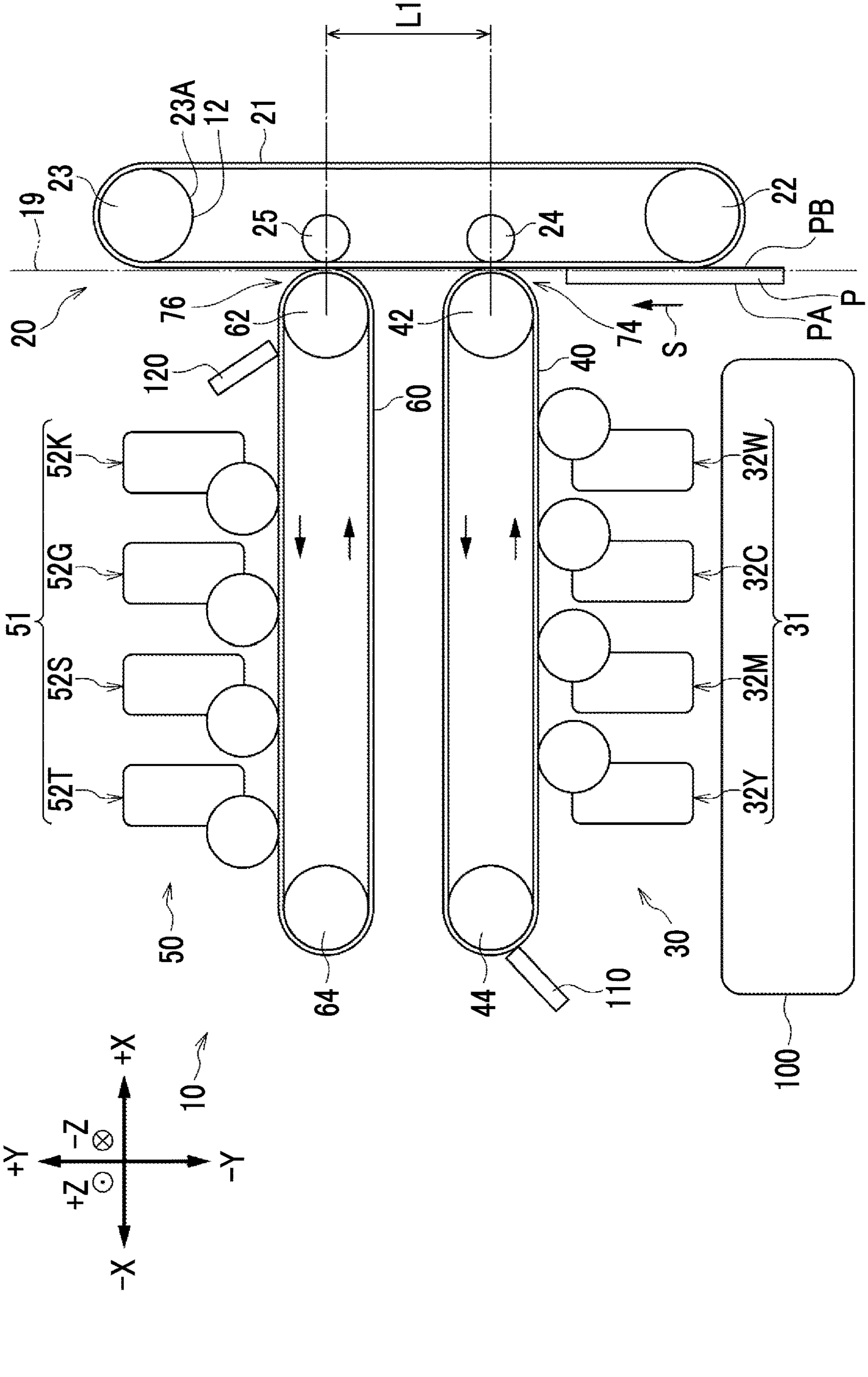
FIG. 3 is a schematic diagram of a main part of the image forming apparatus according to the first embodiment.

As shown in FIGS. 2 and 3, the image forming unit 30 includes a plurality of (four in the present exemplary embodiment) image forming sections 32, and a first endless intermediate transfer belt 40. The four image forming sections 32 are designated as a first image forming group 31. The toner images formed by the four image forming sections 32 are transferred to the first intermediate transfer belt 40 as an example of the first intermediate transfer body, and the first intermediate transfer belt 40 is mounted to be rotatable counterclockwise with a front view of FIG. 2.

The image forming section 32 includes an image forming section 32W that forms a white toner image of white color, an image forming section 32M that forms a magenta toner image of magenta color, an image forming section 32C that forms a cyan toner image of cyan color, and an image forming section 32Y that forms a yellow toner image of yellow color. The four image forming sections 32 are disposed in the order of the image forming section 32Y, the image forming section 32M, the image forming section 32C, and the image forming section 32W in order from the upstream side in the rotation direction (the side closer to the support roll 44 described later) in which the first intermediate transfer belt 40 rotates. In a case where it is not necessary to distinguish between Y, M, C, and W, Y, M, C, and W are omitted.

Further, in the following, the upstream side in the rotation direction of the first intermediate transfer belt 40 is referred to as "the rotation direction upstream side", and the downstream side in the rotation direction is referred to as "the rotation direction downstream side". That is, in the image forming section 32, the image forming section 32W is disposed on the most rotation direction downstream side.

As shown in FIG. 2, the image forming section 32 includes a photoconductor 33, a photoconductor charging member 34 that charges the peripheral surface of the photoconductor 33, an exposure device 35 that irradiates the charged photoconductor 33 with exposure light, and a developing device 36 that develops an electrostatic latent image formed by the irradiation of the exposure light to be visualized as a toner image.

Developing rolls 39Y, 39M, 39C, and 39W are provided in the developing device 36, respectively, and are applied with a developing bias by the power supply device 99 (see FIG. 5), respectively.

Further, primary transfer rolls 37Y, 37M, 37C, and 37W for transferring the toner image formed by the image forming section 32 to the first intermediate transfer belt 40 are disposed at positions facing each photoconductor 33 with the first intermediate transfer belt 40 interposed therebetween. The first intermediate transfer belt 40 is wound around a support roll 44 that supports the first intermediate transfer belt 40 and a backup roll 42 that is disposed on the first transfer unit 74 on the upstream side, which will be described later. The primary transfer unit 70 includes a photoconductor 33, a primary transfer roll 37, and a first intermediate transfer belt 40. Further, the primary transfer positions TY1, TM1, TC1, and TW1 are set between the photoconductors 33Y, 33M, 33C, and 33W and the first intermediate transfer belt 40, respectively.

The image forming unit 50 has the same configuration as the above-described image forming unit 30 except that colors for forming an image are different.

As shown in FIGS. 2 and 3, the image forming unit 50 includes a plurality of (four in the present exemplary embodiment) image forming sections 52, and a second intermediate transfer belt 60. The four image forming sections 52 are designated as a second image forming group 51. The toner images formed by the four image forming sections 52 are transferred to the second intermediate transfer belt 60 as an example of the second intermediate transfer body, and the second intermediate transfer belt 60 is mounted to be rotatable counterclockwise with a front view of FIG. 2.

The image forming section 52 has the same configuration as the image forming section 32 of the image forming unit 30 except that colors for forming an image are different. Further, the second intermediate transfer belt 60 and the primary transfer roll 57 described later have the same configuration as the first intermediate transfer belt 40 and the primary transfer roll 37 of the image forming unit 30. Further, the other constituent members configuring the image forming unit 50 are the same as in the image forming unit 30.

As shown in FIG. 2, the image forming section 52 includes an image forming section 52K that forms a black toner image of black color, an image forming section 52G that forms a gold toner image of gold color, an image forming section 52S that forms a silver toner image of silver color, and an image forming section 52T that forms a transparent toner image. In a case where it is not necessary to distinguish between T, S, G, and K, T, S, G, and K are omitted.

The four image forming sections 52 are disposed in the order of the image forming section 52T, the image forming section 52S, the image forming section 52G, and the image forming section 52K in order from the rotation direction upstream side (the side closer to the support roll 64 described later). That is, in the image forming section 52, the image forming section 52K is disposed on the most rotation direction downstream side, the image forming section 52G and the image forming section 52S are disposed on the rotation direction upstream side with respect to the image forming section 52K, and the image forming section 52T is disposed on the most rotation direction upstream side.

The image forming section 52 includes a photoconductor 53, a photoconductor charging member 54, an exposure device 55, and a developing device 56.

Developing rolls 59T, 59S, 59G, and 59K are provided in the developing device 56, respectively, and are applied with a developing bias by the power supply device 99 (see FIG. 4), respectively.

Further, the primary transfer rolls 57T, 57S, 57G, and 57K are disposed at positions facing respective photoconductors 53 with the second intermediate transfer belt 60 interposed therebetween. The second intermediate transfer belt 60 is wound around a support roll 64 and a backup roll 62 disposed on a second transfer unit 76 on the downstream side, which will be described later. The primary transfer unit 72 includes the photoconductor 53, the primary transfer roll 57, and the second intermediate transfer belt 60. Further, the primary transfer positions TT1, TS1, TG1, and TK1 are set between the photoconductors 53T, 53S, 53G, and 53K and the second intermediate transfer belt 60, respectively.

The developing device 36 of the image forming section 32 of each color of the image forming unit 30 and the developing device 56 of the image forming section 52 of each color of the image forming unit 50 are connected to a plurality of toner cartridges (not shown) in which a toner corresponding to each color is accommodated via a supply path. The toner accommodated in each toner cartridge is appropriately supplied to the developing devices 36 and 56 of each color via the supply path by operating a supply device (not shown) provided in the supply path.

Conveyor Belt Device

Next, the details of the conveyor belt device 20 will be described.

As shown in FIGS. 2 and 3, the conveyor belt device 20 includes an endless conveyor belt 21, a tension roll 22 that supports and stretches the conveyor belt 21, a drive roll 23 that rotates the conveyor belt 21, and secondary transfer rolls 24 and 25 disposed at positions facing the backup rolls 42 and 62 with the first intermediate transfer belt 40 and the second intermediate transfer belt 60 interposed therebetween.

The conveyor belt 21 as an example of the conveyance unit is stretched by the tension roll 22 and the drive roll 23 provided at intervals in the conveyance direction of the recording paper P (see FIG. 3), in the vertical direction (Y direction) in the present exemplary embodiment. The drive roll 23 is rotated by a drive mechanism (not shown), so that the endless conveyor belt 21 is rotated. The tension roll 22 is driven to rotate with the rotation of the conveyor belt 21.

The conveyance direction of the recording paper P to be conveyed by the conveyor belt device 20 in the present exemplary embodiment is the Y direction.

The secondary transfer roll 24 sandwiches the recording paper P (see FIGS. 1 and 4) and the conveyor belt 21 between the backup roll 42 and the secondary transfer roll 24, and transfers the toner image formed on the first intermediate transfer belt 40 of the image forming unit 30 to the surface PA (see FIG. 3) of the recording paper P conveyed by the conveyor belt 21. Similarly, the secondary transfer roll 25 sandwiches the recording paper P and the conveyor belt 21 between the backup roll 62 and the secondary transfer roll 25, and transfers the toner image formed on the second intermediate transfer belt 60 of the image forming unit 50 to the surface PA (see FIG. 3) of the recording paper P.

As shown in FIG. 3, the side of the recording paper P on which the toner image is transferred is referred to as a surface PA, and the side in contact with the conveyor belt 21 is referred to as a surface PB.

As shown in FIGS. 2 and 3, the first transfer unit 74 includes the backup roll 42, the secondary transfer roll 24, and the first intermediate transfer belt 40. The second transfer unit 76 includes the backup roll 62, the secondary transfer roll 25, and the second intermediate transfer belt 60.

The secondary transfer rolls 24 and 25 are driven to rotate with the rotation of the conveyor belt 21. Further, a transfer bias is applied to the secondary transfer rolls 24 and 25 by the power supply device 99 (see FIG. 4), respectively.

The secondary transfer position TJ2 is defined between the first intermediate transfer belt 40 of the image forming unit 30 and the conveyor belt 21, and the secondary transfer position TK2 is defined between the second intermediate transfer belt 60 of the image forming unit 50 and the conveyor belt 21. The secondary transfer position TK2 is the most downstream secondary transfer position.

Further, the conveyor belt device 20 includes a belt cleaning device (not shown) that cleans the conveyor belt 21. The belt cleaning device (not shown) performs cleaning on the rotation direction upstream side of the most downstream secondary transfer position TK2 and on the rotation direction downstream side of the most upstream secondary transfer position TJ2.

Main Part Configuration

Next, the configuration of the main part of the present exemplary embodiment will be described, although the description will be partially repeated.

As shown in FIGS. 2 and 3, in the present exemplary embodiment, the second image forming group 51 composed of the plurality of image forming sections 52 of the image forming unit 50 is disposed on the downstream side in the conveyance direction of the first image forming group 31 composed of the plurality of image forming sections 32 of the image forming unit 30. The first intermediate transfer belt 40 is provided on the downstream side in the conveyance direction of the first image forming group 31. Further, the second intermediate transfer belt 60 is provided on the upstream side in the conveyance direction of the second image forming group 51. From another point of view, the first intermediate transfer belt 40 and the second intermediate transfer belt 60 are arranged in the conveyance direction between the first image forming group 31 and the second image forming group 51 arranged in the conveyance direction. The first intermediate transfer belt 40 and the second intermediate transfer belt 60 are independently provided and are not shared.

The conveyor belt 21 is wound around the tension roll 22 and the drive roll 23, and is stretched in the conveyance direction. Further, the distance L1 between the first transfer unit 74 and the second transfer unit 76 in the conveyor belt 21 is set to an integral multiple (the same magnification in the present exemplary embodiment) of the peripheral surface length L2 of the peripheral surface 23A of the drive roll 23. That is, it is set that L1=L2.

In a case where L1 is in the range of ±0.3% with respect to L2, L1=L2. In a case where L1 is in the range of ±0.3% with respect to an integral multiple of L2, L1 is an integral multiple of L2.

The first intermediate transfer belt 40 is stretched with the direction intersecting the conveyance path 19 (see also FIG. 1) (the X direction in the present exemplary embodiment) as the longitudinal direction. The plurality of image forming sections 32 configuring the first image forming group 31 are arranged in the longitudinal direction on the upstream side in the conveyance direction of the first intermediate transfer belt 40. The second intermediate transfer belt 60 is stretched with the direction intersecting the conveyance path 19 (see also FIG. 1) (the X direction in the present exemplary embodiment) as the longitudinal direction. That is, the plurality of image forming sections 52 configuring the second image forming group 51 are arranged in the longitudinal direction on the downstream side in the conveyance direction of the second intermediate transfer belt 60.

From another point of view, the first intermediate transfer belt 40 and the second intermediate transfer belt 60 are provided with the direction intersecting the conveyance path 19 (the X direction in the present exemplary embodiment) as the longitudinal direction, and are arranged in parallel or substantially parallel to the Y direction, in a side view viewed from the Z direction which is the rotation axis direction of the first intermediate transfer belt 40 and the second intermediate transfer belt 60.

As shown in FIG. 3, the image forming unit 30 has a first cleaning blade 110 as an example of a first cleaning member that cleans the first intermediate transfer belt 40. The first cleaning blade 110 is provided at a position to clean a part of the first intermediate transfer belt 40 that is wound around the support roll 44, which is the folded end portion in the longitudinal direction after the secondary transfer.

Further, the image forming unit 50 has a second cleaning blade 120 as an example of a second cleaning member that cleans the second intermediate transfer belt 60. The second cleaning blade 120 is provided at a position to clean between the second transfer unit 76 and the image forming section 52K of the second image forming group 51 after the secondary transfer of the second intermediate transfer belt 60.

From another point of view, the first cleaning blade 110 and the second cleaning blade 120 are not provided between the first intermediate transfer belt 40 and the second intermediate transfer belt 60.

Further, as shown in FIGS. 2 and 3, the electric substrate 100 provided with the control device 80, the power supply device 99 (see FIG. 4), which will be described later, and the like is provided on the upstream side in the conveyance direction of the first image forming group 31 (in the present exemplary embodiment, at the lower end portion of the image forming apparatus 10).

As described above, between the first intermediate transfer belt 40 and the second intermediate transfer belt 60, the first image forming group 31, the second image forming group 51, the first cleaning blade 110, the second cleaning blade 120, an electric substrate 100, or the like are not provided. Therefore, the distance between the first transfer unit 74 and the second transfer unit 76 arranged in the conveyance direction is narrow.

Control Device

Next, the control device 80 that controls the operation of the image forming apparatus 10 will be described with reference to FIG. 6.

Figure 6:
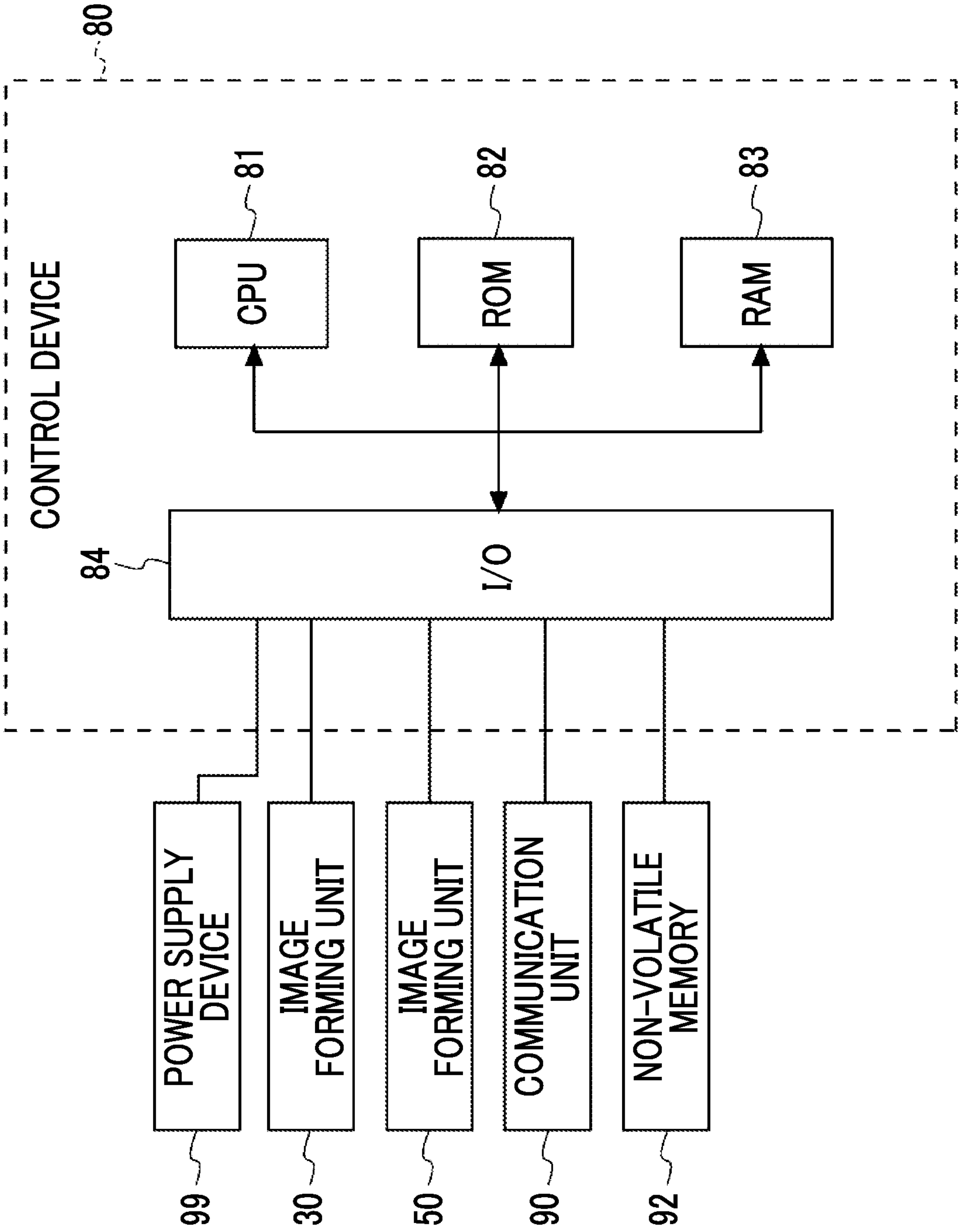

As shown in FIG. 6, an image forming unit 30, an image forming unit 50, a communication unit 90, a non-volatile memory 92, a power supply device 99, or the like are electrically connected to the control device 80.

The control device 80 is connected to a Central Processing Unit (CPU) 81, a Read Only Memory (ROM) 82, a Random Access Memory (RAM) 83, and an input/output interface (I/O) 84 via a bus.

Here, the ROM 82 stores an image formation control program (not shown) to be executed by the CPU 81. Then, the CPU 81 reads the image formation control program (not shown) from the ROM 82 and expands the image formation control program into the RAM 83 to execute a printing process by the image formation control program (not shown).

Further, the image forming unit 30, the image forming unit 50, the communication unit 90, and the non-volatile memory 92 are connected to the I/O 84. The communication unit 90 is an interface for mutual data communication between a terminal device such as a personal computer (not shown) and an image forming apparatus 10. The non-volatile memory 92 stores information necessary for the image forming apparatus 10 to execute the image forming operation.

The control device 80 performs various controls for forming a toner image on the first intermediate transfer belt 40 (see FIG. 2 and the like) by the image forming section 32 (see FIG. 2 and the like) of each color of the image forming unit 30. Similarly, various controls are performed for forming a toner image on the second intermediate transfer belt 60 (see FIG. 2 and the like) by the image forming section 52 (see FIG. 2 and the like) of each color of the image forming unit 50.

Further, the control device 80 controls the developing bias to be applied to the developing rolls 39Y, 39M, 39C, 39W, 59T, 59S, 59G, and 59K (see FIG. 2 or the like) of the developing devices 36 and 56 by the power supply device 99. Further, the control device 80 controls the transfer bias to be applied to the secondary transfer rolls 24 and 25 (see FIG. 2 or the like) by the power supply device 99.

Image Formation Process

Next, the outline of the image formation process in the image forming apparatus 10 will be described.

First, the control device 80 controls each image forming section 32 such that a toner image is formed on the first intermediate transfer belt 40 of the image forming unit 30. Similarly, each image forming section 52 is controlled such that a toner image is formed on the second intermediate transfer belt 60 of the image forming unit 50.

Specifically, the control device 80 applies a voltage to the photoconductor charging members 34, 54, and charges the peripheral surfaces of the photoconductors 33 and 53 so as to have a predetermined potential, by using the photoconductor charging members 34 and 54 to which the voltage is applied. Subsequently, the control device 80 irradiates the peripheral surfaces of the photoconductors 33 and 53 charged by the photoconductor charging members 34 and 54 with exposure light by the exposure devices 35 and 55 to form an electrostatic latent image, based on the image data acquired via the communication unit 90. Thus, an electrostatic latent image corresponding to the image data is formed on the peripheral surfaces of the photoconductors 33 and 53.

Next, the control device 80 develops the electrostatic latent image formed by the exposure devices 35 and 55 by the developing devices 36 and 56 and visualizes the electrostatic latent image as a toner image. Further, the control device 80 superimposes and transfers the toner image formed on the peripheral surfaces of the photoconductors 33 and 53 of each color on the first intermediate transfer belt 40 and the second intermediate transfer belt 60, by the primary transfer rolls 37 and 57.

In this way, in the image forming unit 30, for example, a toner image on which yellow (Y), magenta (M), cyan (C), and white (W) toners are superimposed is formed on the first intermediate transfer belt 40. Similarly, in the image forming unit 50, for example, a toner image in which black (K), gold (G), silver (S), and transparent (T) toners are superimposed is formed on the second intermediate transfer belt 60.

Here, the recording paper P sent out from the accommodating unit 12 to the conveyance path 19 by the feed roll 13 is sent out to the secondary transfer position TJ2 on the upstream side in the conveyance direction, after the convey timing is adjusted by the resist roll pair 15 based on the control of the control device 80. At the secondary transfer position TJ2, the recording paper P is conveyed between the backup roll 42 and the secondary transfer roll 24, so that the toner image on the outer peripheral surface of the first intermediate transfer belt 40 is transferred to the recording paper P. Then, the recording paper P on which the toner image is transferred is conveyed to the conveyance direction downstream side and reaches the secondary transfer position TK2 on the conveyance direction downstream side.

At this time, the control device 80 adjusts the timing to start image formation such that the toner image formed on the second intermediate transfer belt 60 of the image forming unit 50 is superimposed and transferred on the toner image on the recording paper P that have been conveyed from the conveyance direction upstream side.

The recording paper P, on which the toner images of each color formed by the image forming unit 30 and the image forming unit 50 are superimposed and transferred, is fixed by the fixing roll pair 16 of the fixing device 18, and then is discharged to the discharge unit 9 provided on the upper part of the image forming apparatus main body 10A, by the discharge roll 17.

Action

Next, the action of the present exemplary embodiment will be described.

The second image forming group 51 composed of the plurality of image forming sections 52 of the image forming unit 50 is disposed on the downstream side in the conveyance direction of the first image forming group 31 composed of the plurality of image forming sections 32 of the image forming unit 30. The first intermediate transfer belt 40 is provided on the downstream side in the conveyance direction of the first image forming group 31. The second intermediate transfer belt 60 is provided on the upstream side in the conveyance direction of the second image forming group 51. That is, the first image forming group 31 and the second image forming group 51 are not provided between the first intermediate transfer belt 40 and the second intermediate transfer belt 60. Therefore, compared with the case where the image forming sections 32 and 52 are located between the first intermediate transfer belt 40 and the second intermediate transfer belt 60 arranged in the conveyance direction, the space between the first transfer unit 74 and the second transfer unit 76 in the conveyance path 19 may be narrowed.

In this way, by narrowing the space between the first transfer units 74 and the second transfer unit 76 arranged in the conveyance direction, the separation of the recording paper P conveyed between the first transfer units 74 and the second transfer unit 76 from the conveyance path 19 is prevented. Therefore, the misalignment of the superposition of the toner images in the second transfer unit 76 due to the separation of the recording paper P conveyed between the first transfer unit 74 and the second transfer unit 76 arranged in the conveyance direction from the conveyance path 19 is prevented.

Further, the conveyor belt 21 is wound around the tension roll 22 and the drive roll 23, and is stretched in the conveyance direction. Further, the distance L1 between the first transfer unit 74 and the second transfer unit 76 in the conveyor belt 21 is set to an integral multiple (the same magnification (L1=L2) in the present exemplary embodiment) of the peripheral surface length L2 of the peripheral surface 23A of the drive roll 23.

Therefore, the influence of rotation unevenness of the drive roll 23 is small, as compared with the case where the distance L1 between the first transfer unit 74 and the second transfer unit 76 in the conveyor belt 21 is a non-integral multiple of the peripheral surface length L2 of the peripheral surface 23A of the drive roll 23. Specifically, in a case of an integral multiple, the influence of the rotation unevenness in the first transfer unit 74 is canceled by the second transfer unit 76, so that the influence of the rotation unevenness of the drive roll 23 is reduced.

Further, since the distance L1 between the first transfer unit 74 and the second transfer unit 76 in the conveyor belt 21 is equal to the peripheral surface length L2 of the peripheral surface 23A of the drive roll 23, a space between the first transfer unit 74 and the second transfer unit 76 becomes narrower, as compared with a case where the distance L1 is equal to or more than twice the peripheral surface length L2.

Further, the first intermediate transfer belt 40 is stretched with the direction intersecting the conveyance path 19 (the X direction in the present exemplary embodiment) as the longitudinal direction. Therefore, the space between the first transfer unit 74 and the second transfer unit 76 in the conveyance path 19 can be narrowed, as compared with the case where the first intermediate transfer body is a drum instead of a belt.

Further, the second intermediate transfer belt 60 is stretched with the direction intersecting the conveyance path 19 (the X direction in the present exemplary embodiment) as the longitudinal direction. Therefore, the space between the first transfer unit 74 and the second transfer unit 76 in the conveyance path 19 can be narrowed, as compared with the case where the second intermediate transfer body is a drum instead of a belt.

Further, the first cleaning blade 110 is provided at a position to clean a part of the first intermediate transfer belt 40 that is wound around the support roll 44, which is the folded end portion in the longitudinal direction after the secondary transfer. Therefore, as compared with the case where the first cleaning blade 110 is located between the first intermediate transfer belt 40 and the second intermediate transfer belt 60, the distance between the first intermediate transfer belt 40 and the second intermediate transfer belt 60 can be narrowed, so that the space between the first transfer unit 74 and the second transfer unit 76 in the conveyance path 19 may be narrowed.

Further, the second cleaning blade 120 is provided between the second transfer unit 76 and the image forming section 52K of the second image forming group 51 after the secondary transfer of the second intermediate transfer belt 60. As compared with the case where the second cleaning blade 120 is located between the first intermediate transfer belt 40 and the second intermediate transfer belt 60, the distance between the first intermediate transfer belt 40 and the second intermediate transfer belt 60 can be narrowed, so that the space between the first transfer unit 74 and the second transfer unit 76 in the conveyance path 19 may be narrowed.

Further, the electric substrate 100 provided with the control device 80, the power supply device 99, and the like is provided on the upstream side in the conveyance direction of the first image forming group 31 (in the present exemplary embodiment, at the lower end portion of the image forming apparatus 10). Therefore, as compared with the case where the electric substrate 100 is located between the first intermediate transfer belt 40 and the second intermediate transfer belt 60, the distance between the first intermediate transfer belt 40 and the second intermediate transfer belt 60 can be narrowed, so that the space between the first transfer unit 74 and the second transfer unit 76 in the conveyance path 19 may be narrowed.

Second Exemplary Embodiment

Next, an image forming apparatus according to a second exemplary embodiment of the present invention will be described. The first exemplary embodiment has the same configuration except that the distance between the first transfer unit 74 and the second transfer unit 76 is different. Therefore, other explanations will be omitted or simplified.

Main Part Configuration

The main part configuration of the present exemplary embodiment will be described.

Figure 4:
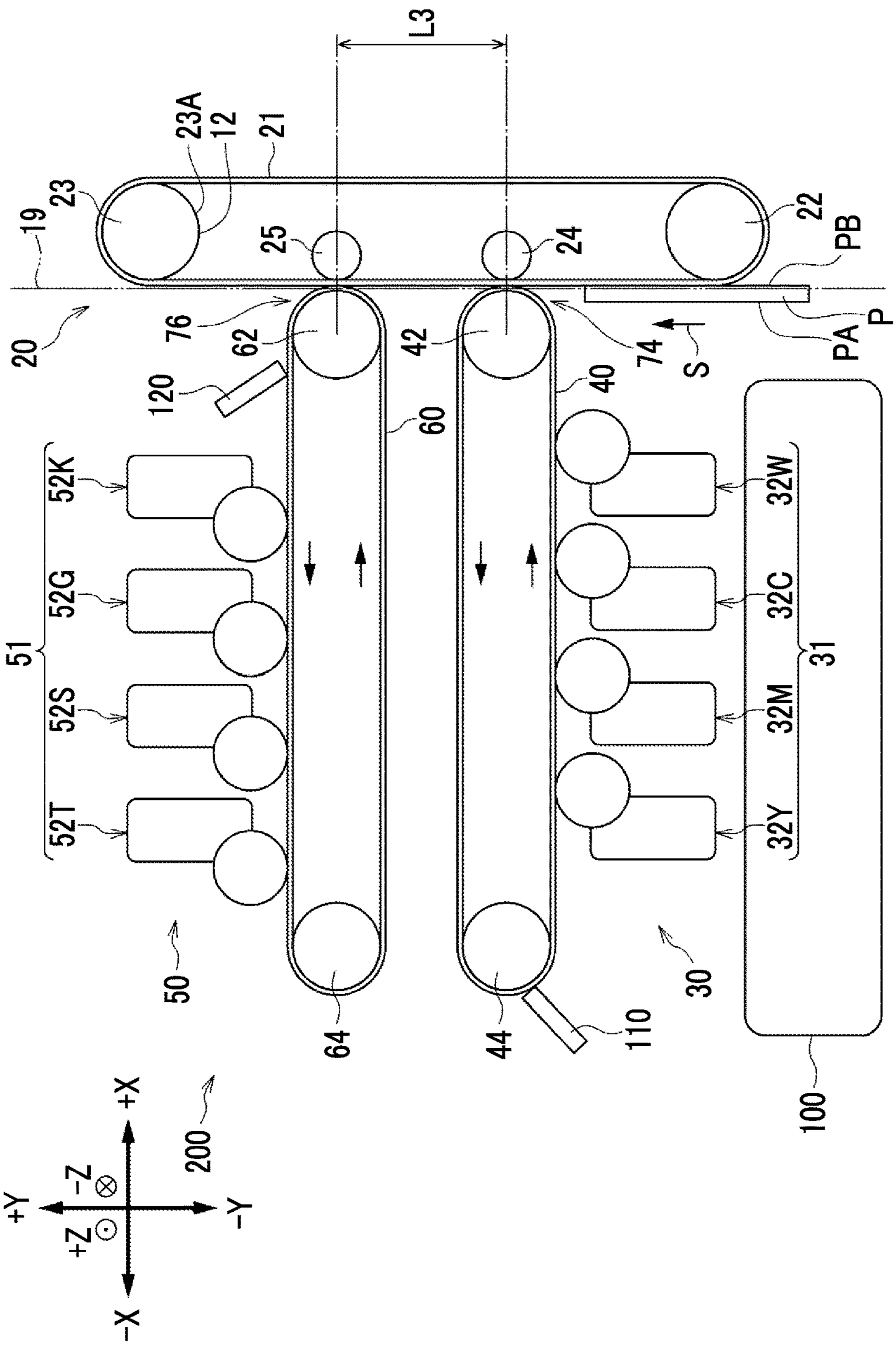
FIG. 4 is a schematic diagram of a main part of the image forming apparatus according to the first exemplary embodiment.

The width of the minimum recording paper PS in the image forming apparatus 200 of the present exemplary embodiment shown in FIG. 4 in the conveyance direction is defined as the minimum width LS. In the present exemplary embodiment, the minimum width LS is for the lateral feed of the A5-size recording paper PS. That is, in the present exemplary embodiment, the minimum width LS is for the short side width of A5 size.

The distance L3 between the first transfer unit 74 and the second transfer unit 76 is less than the minimum width LS. The distance L1 is the distance between the axes of the secondary transfer rolls 24 and 25.

Action

Next, the action of the present exemplary embodiment will be described.

Since the distance L3 between the first transfer unit 74 and the second transfer unit 76 is less than the minimum width LS, in a case where the recording paper PS having the minimum width LS is conveyed, the recording paper PS rests on both the first transfer unit 74 and the second transfer unit 76.

Therefore, the separation of the recording paper PS from the conveyance path 19 is prevented, as compared with the case where the distance L3 between the first transfer unit 74 and the second transfer unit 76 is larger than the minimum width LS.

Reference Example

The image forming apparatus of a reference example will be described.

Configuration

First, the configuration of the reference example will be described.

Figure 5:
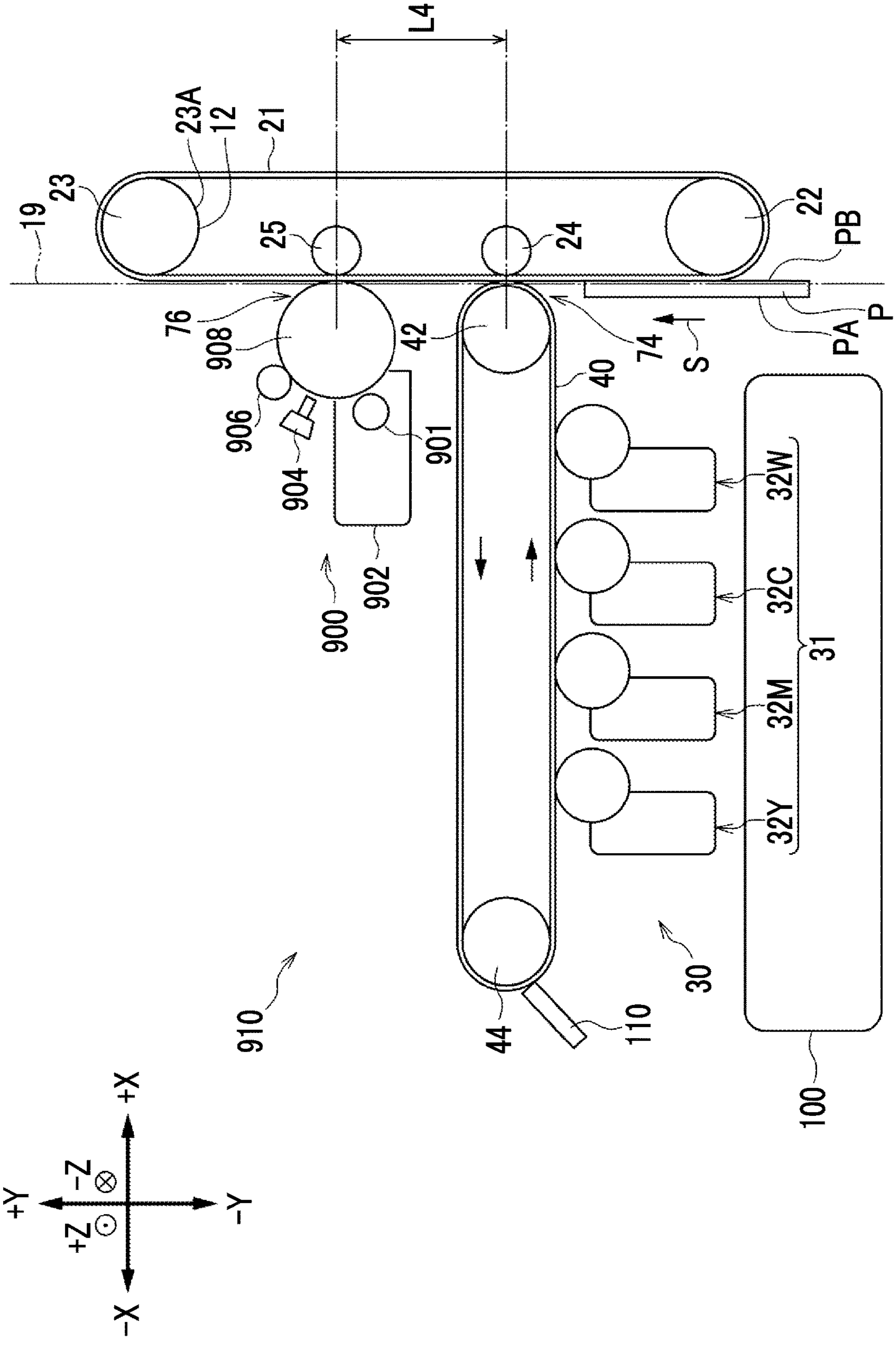
FIG. 5 is a schematic diagram of a main part of an image forming apparatus according to a reference example.

An image forming apparatus 910 of a reference example shown in FIG. 5 includes an image forming unit 30 that forms a toner image to be transferred to the recording paper P, an image forming section 900, and the like. Since the image forming unit 30, the other control device 80, the conveyor belt device 20, and the like are the same as in the first exemplary embodiment and the second exemplary embodiment described above, the description thereof will be omitted.

The image forming section 900 is disposed at the same place as the image forming unit 50 (see FIGS. 3 and 4) in the first exemplary embodiment and the second exemplary embodiment. The image forming section 900 includes a photoconductor 908, a photoconductor charging member 906, an exposure device 904, and a developing device 902.

The developing device 902 has a developing roll 901 to which a developing bias is applied. In addition, the image forming section 900 of the present exemplary embodiment forms a black (K) toner image.

The first intermediate transfer belt 40 is provided on the downstream side in the conveyance direction of the first image forming group 31. Further, the distance L4 between the first transfer unit 74 and the second transfer unit 76 in the conveyor belt 21 is equal to the peripheral surface length L2 of the peripheral surface 23A of the drive roll 23 (L4=L2), or is less than the minimum width LS.

Image Formation Process

Next, the outline of the image formation process in the image forming apparatus 910 will be described.

First, the control device 80 controls each image forming section 32 such that a toner image is formed on the first intermediate transfer belt 40 of the image forming unit 30. Similarly, control is performed such that the toner image is formed on the photoconductor 908 of the image forming section 900.

Next, a specific image formation process will be described. Since the formation of the toner image on the first intermediate transfer belt 40 of the image forming unit 30 is the same as in the first exemplary embodiment and the second exemplary embodiment described above, the description will be omitted.

The control device 80 applies a voltage to the photoconductor charging member 906, and charges the peripheral surfaces of the photoconductor 908 so as to have a predetermined potential, by using the photoconductor charging member 906 to which the voltage is applied. Subsequently, the control device 80 irradiates the peripheral surfaces of the photoconductor 908 charged by the photoconductor charging member 906 with exposure light by the exposure device 904 to form an electrostatic latent image, based on the image data acquired via the communication unit 90. Thus, an electrostatic latent image corresponding to the image data is formed on the peripheral surfaces of the photoconductor 908.

Next, the control device 80 develops the electrostatic latent image formed by the exposure device 904 by the developing device 902 and visualizes the electrostatic latent image as a toner image.

In this way, in the image forming unit 30, for example, a toner image on which yellow (Y), magenta (M), cyan (C), and white (W) toners are superimposed is formed on the first intermediate transfer belt 40. Similarly, the toner image of black (K) is formed on the photoconductor 908 of the image forming section 900.

Here, the recording paper P sent out from the accommodating unit 12 to the conveyance path 19 by the feed roll 13 is sent out to the secondary transfer position TJ2 on the upstream side in the conveyance direction, after the convey timing is adjusted by the resist roll pair 15 based on the control of the control device 80. At the secondary transfer position TJ2, the recording paper P is conveyed between the backup roll 42 and the secondary transfer roll 24, so that the toner image on the outer peripheral surface of the first intermediate transfer belt 40 is transferred to the recording paper P. Then, the recording paper P on which the toner image is transferred is conveyed to the conveyance direction downstream side and reaches the secondary transfer position TK2 on the conveyance direction downstream side.

At this time, the control device 80 adjusts the timing to start image formation such that the toner image formed on the photoconductor 908 of the image forming section 900 is superimposed and transferred on the toner image on the recording paper P that have been conveyed from the conveyance direction upstream side.

The recording paper P, on which the toner images of each color formed by the image forming unit 30 and the image forming section 900 are superimposed and transferred, is fixed by the fixing roll pair 16 of the fixing device 18, and then is discharged to the discharge unit 9 provided on the upper part of the image forming apparatus main body 10A, by the discharge roll 17.

Action

The first intermediate transfer belt 40 is provided on the downstream side in the conveyance direction of the first image forming group 31, and the first image forming group 31 is not provided between the first intermediate transfer belt 40 and the photoconductor 908. Therefore, compared with the case where the first image forming group 31 is located on the downstream side in the conveyance direction of the first intermediate transfer belt 40, the space between the first transfer unit 74 and the second transfer unit 76 in the conveyance path 19 may be narrowed.

Then, by narrowing the space between the first transfer units 74 and the second transfer unit 76 arranged in the conveyance direction, the separation of the recording paper P conveyed between the first transfer units 74 and the second transfer unit 76 from the conveyance path 19 is prevented. Therefore, the misalignment of the superposition of the toner images in the second transfer unit 76 due to the separation of the recording paper P conveyed between the first transfer unit 74 and the second transfer unit 76 arranged in the conveyance direction from the conveyance path 19 is prevented.

In a case where the distance L4 between the first transfer unit 74 and the second transfer unit 76 in the conveyor belt 21 is equal to the peripheral surface length L2 of the peripheral surface 23A of the drive roll 23 (L4=L2), the influence of rotation unevenness of the drive roll 23 is smaller, and a space between the first transfer unit 74 and the second transfer unit 76 may be narrowed, as compared with the case where the distance L4 is a non-integral multiple of the peripheral surface length L2 of the peripheral surface 23A of the drive roll 23.

Further, in a case where the distance L4 between the first transfer unit 74 and the second transfer unit 76 is less than the minimum width LS, the separation of the recording paper PS from the conveyance path 19 is prevented, as compared with the case where the distance L4 is larger than the minimum width LS.

Others

The present invention is not limited to the above exemplary embodiments.

For example, in the above exemplary embodiments, in the first exemplary embodiment, the distance L1 between the first transfer unit 74 and the second transfer unit 76 in the conveyor belt 21 is equal to the peripheral surface length L2 of the peripheral surface 23A of the drive roll 23 (L1=L2), but the distance L2 may be an integral multiple of 2 or more. Even in a case where L1 is an integral multiple of 2 or more of L2, the influence of rotation unevenness of the drive roll 23 is small, which is preferable. However, the present invention is not limited to the case where L1 is an integral multiple of L2.

Further, for example, in the above exemplary embodiments, in the second exemplary embodiment, the distance L3 between the first transfer unit 74 and the second transfer unit 76 in the conveyor belt 21 is less than the minimum width LS, but may be equal to or less than the minimum width LS. Even in a case where L3 is the same as LS, the separation of the recording paper PS from the conveyance path 19 is prevented. However, the present invention is not limited to the case where L3 is equal to or less than LS.

Further, for example, the distance between the first transfer unit 74 and the second transfer unit 76 in the conveyor belt 21 may be equal to the peripheral surface length of the peripheral surface 23A of the drive roll 23 and less than the minimum width LS.

Further, for example, in the above exemplary embodiments, the first cleaning blade 110 is provided in a position to clean a part of the first intermediate transfer belt 40 that is wound around the support roll 44, which is the folded end portion in the longitudinal direction after the secondary transfer, but the present invention is not limited thereto. The first cleaning blade 110 may clean a space between a part of the first intermediate transfer belt 40 that is wound around the support roll 44, which is the folded end portion in the longitudinal direction after the secondary transfer and the image forming section 32Y of the first image forming group 31.

Further, for example, in the above exemplary embodiments, the first intermediate transfer belt 40 is cleaned by the first cleaning blade 110, but the present invention is not limited thereto. For example, the first intermediate transfer belt 40 may be cleaned with a brush.

Further, for example, in the above exemplary embodiments, the second intermediate transfer belt 60 is cleaned by the second cleaning blade 120, but the present invention is not limited thereto. For example, the second intermediate transfer belt 60 may be cleaned with a brush.

Further, for example, in the above exemplary embodiments, the image forming units 30 and 50 have four image forming sections 32 and 52, respectively, but the present invention is not limited thereto. The image forming unit may have two or more image forming sections.

Further, for example, in the above exemplary embodiments, the image forming apparatus 10 includes two image forming units, that is, the image forming unit 30 and the image forming unit 50, but the present invention is not limited thereto. The image forming apparatus may include three or more image forming units.

Further, in the above exemplary embodiments, the electric substrate 100 is on the upstream side in the conveyance direction of the first image forming group 31, but the present invention is not limited thereto. The electric substrate 100 may be provided on the downstream side in the conveyance direction of the second image forming group 51.

Further, for example, in the above exemplary embodiments, the recording medium is the recording paper P such as plain paper, but the present invention is not limited thereto. The recording medium may be a sheet-like member such as an OHP.

Further, for example, in the above exemplary embodiments, the conveyance unit that conveys a recording medium in contact with one surface of the recording medium is the conveyor belt 21, but the conveyance unit is not limited thereto. The conveyance unit may be, for example, a drum other than the belt.

Further, for example, in the above exemplary embodiments, the first intermediate transfer body and the second intermediate transfer body on which the toner image is primarily transferred are the first intermediate transfer belt 40 and the second intermediate transfer belt 60, but the present invention is not limited thereto. The first intermediate transfer body and the second intermediate transfer body may be, for example, a drum other than the belt.

Further, the configuration of the image forming apparatus is not limited to the configuration of the above exemplary embodiments, and various configurations can be used. Further, the present invention can be implemented in various ways without departing from the concept of the present invention.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An image forming apparatus comprising:

a conveyance unit that conveys a recording medium in contact with one surface of the recording medium along a conveyance path;

a first image forming group that is provided on the other surface side of the recording medium in the conveyance path, and includes a plurality of image forming sections that form a toner image;

a second image forming group that is provided on a downstream side of the first image forming group in the conveyance path on the other surface side of the recording medium in the conveyance path, and includes a plurality of image forming sections that form a toner image;

a first intermediate transfer body that is provided on the downstream side of the first image forming group in the conveyance path, and to which the toner image formed by the plurality of image forming sections of the first image forming group is primarily transferred;

a second intermediate transfer body that is provided on an upstream side of the second image forming group in the conveyance path, and to which the toner image formed by the plurality of image forming sections of the second image forming group is primarily transferred;

a first transfer unit that secondarily transfers the toner image from the first intermediate transfer body to the other surface of the recording medium conveyed by the conveyance unit; and a second transfer unit that secondarily transfers the toner image from the second intermediate transfer body to the other surface of the recording medium conveyed by the conveyance unit, wherein the first image forming group, the first intermediate transfer body, the second intermediate transfer body, and the second image forming group are arranged in this order from the upstream side in the conveyance path, and wherein image forming groups including the first image forming group and the second image forming group are not located between the first intermediate transfer body and the second intermediate transfer body, wherein the conveyance unit is a conveyor belt wound around a tension roll and a drive roll, and a distance between the first transfer unit and the second transfer unit in the conveyor belt is set to an integral multiple of a peripheral surface length of the drive roll, and the distance between the first transfer unit and the second transfer unit in the conveyor belt and the peripheral surface length of the drive roll are set to be the same length.

2. The image forming apparatus according to claim 1, wherein the first intermediate transfer body is a first intermediate transfer belt stretched with a direction intersecting the conveyance path as a longitudinal direction, in a side view seen from a rotation axis direction, and the plurality of image forming sections configuring the first image forming group are arranged in the longitudinal direction on an upstream side of the first intermediate transfer belt in the conveyance path.

3. The image forming apparatus according to claim 2, further comprising:

a first cleaning member that cleans the first intermediate transfer belt, wherein the first cleaning member is provided at a position to clean a folded end portion of the first intermediate transfer belt in the longitudinal direction or a space between the folded end portion and the first image forming group after the secondary transfer.

4. The image forming apparatus according to claim 1, wherein the second intermediate transfer body is a second intermediate transfer belt stretched with a direction intersecting the conveyance path as a longitudinal direction, in a side view seen from a rotation axis direction, and the plurality of image forming sections configuring the second image forming group are arranged in the longitudinal direction on a downstream side of the second intermediate transfer belt in the conveyance path.

5. The image forming apparatus according to claim 4, further comprising:

a second cleaning member that cleans the second intermediate transfer belt, wherein the second cleaning member is provided at a position to clean a space between the second transfer unit and the second image forming group after the secondary transfer of the second intermediate transfer belt.

6. The image forming apparatus according to claim 1, wherein an electric substrate is disposed on an upstream side of the first image forming group in the conveyance path or a downstream side of the second image forming group in the conveyance path.

7. An image forming apparatus comprising:

a conveyance unit that conveys a recording medium in contact with one surface of the recording medium along a conveyance path;

a first image forming group that is provided on the other surface side of the recording medium in the conveyance path, and includes a plurality of image forming sections that form a toner image;

a second image forming group that is provided on a downstream side in a conveyance direction of the first image forming group on the other surface side of the recording medium in the conveyance path, and includes a plurality of image forming sections that form a toner image;

a first intermediate transfer body that is provided on the downstream side in the conveyance direction of the first image forming group, and to which the toner image formed by the plurality of image forming sections of the first image forming group is primarily transferred;

a second intermediate transfer body that is provided on an upstream side in the conveyance direction of the second image forming group, and to which the toner image formed by the plurality of image forming sections of the second image forming group is primarily transferred;

a first transfer unit that secondarily transfers the toner image from the first intermediate transfer body to the other surface of the recording medium conveyed by the conveyance unit; and a second transfer unit that secondarily transfers the toner image from the second intermediate transfer body to the other surface of the recording medium conveyed by the conveyance unit, wherein a distance between the first transfer unit and the second transfer unit is set to be equal to or less than a minimum width of the recording medium that enables formation of an image, in the conveyance direction of the recording medium.

8. The image forming apparatus according to claim 7, wherein the distance between the first transfer unit and the second transfer unit is set to be less than the minimum width of the recording medium that enables formation of an image, in the conveyance direction of the recording medium.

9. The image forming apparatus according to claim 8, wherein the first intermediate transfer body is a first intermediate transfer belt stretched with a direction intersecting the conveyance path as a longitudinal direction, in a side view seen from a rotation axis direction, and the plurality of image forming sections configuring the first image forming group are arranged in the longitudinal direction on an upstream side of the first intermediate transfer belt in the conveyance path.

10. The image forming apparatus according to claim 9, further comprising:

a first cleaning member that cleans the first intermediate transfer belt, wherein the first cleaning member is provided at a position to clean a folded end portion of the first intermediate transfer belt in the longitudinal direction or a space between the folded end portion and the first image forming group after the secondary transfer.

11. The image forming apparatus according to claim 7, wherein the first intermediate transfer body is a first intermediate transfer belt stretched with a direction intersecting the conveyance path as a longitudinal direction, in a side view seen from a rotation axis direction, and the plurality of image forming sections configuring the first image forming group are arranged in the longitudinal direction on an upstream side of the first intermediate transfer belt in the conveyance path.

12. The image forming apparatus according to claim 11, further comprising:

a first cleaning member that cleans the first intermediate transfer belt, wherein the first cleaning member is provided at a position to clean a folded end portion of the first intermediate transfer belt in the longitudinal direction or a space between the folded end portion and the first image forming group after the secondary transfer.

* * * * *